United States Patent
Jothiprakash et al.

(10) Patent No.: US 12,135,631 B2
(45) Date of Patent: Nov. 5, 2024

(54) ASSISTED DETECTION OF APPLICATION PERFORMANCE ISSUES USING SERVERLESS COMPUTE TEMPLATES

(71) Applicant: Amazon Technologies, Inc., Seattle, WA (US)

(72) Inventors: Sudeeptha Mysore Jothiprakash, Seattle, WA (US); John O'Shea, Borris (IE)

(73) Assignee: Amazon Technologies, Inc., Seattle, WA (US)

( * ) Notice: Subject to any disclaimer, the term of this patent is extended or adjusted under 35 U.S.C. 154(b) by 439 days.

(21) Appl. No.: 17/037,062

(22) Filed: Sep. 29, 2020

(65) Prior Publication Data
US 2022/0100636 A1    Mar. 31, 2022

(51) Int. Cl.
G06F 9/44      (2018.01)
G06F 9/54      (2006.01)
G06F 11/36     (2006.01)

(52) U.S. Cl.
CPC .......... *G06F 11/3612* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 8,832,268 B1 | 9/2014 | Chheda et al. | |
| 9,459,799 B1 | 10/2016 | Naamad | |
| 10,120,746 B1 * | 11/2018 | Sharifi Mehr | H04L 63/1425 |
| 10,176,067 B1 * | 1/2019 | Bramhill | G06F 11/2294 |
| 10,397,236 B1 * | 8/2019 | Chadha | G06F 11/3476 |
| 10,740,765 B1 | 8/2020 | Chheda et al. | |
| 2003/0114949 A1 * | 6/2003 | Armstrong | G06F 11/3419 700/107 |
| 2016/0246691 A1 * | 8/2016 | Clarke | G06F 11/1474 |
| 2017/0060653 A1 * | 3/2017 | Nandakumar | G06F 11/3409 |
| 2018/0300198 A1 | 10/2018 | Symington et al. | |
| 2020/0097347 A1 * | 3/2020 | Mahindru | G06F 11/076 |

(Continued)

FOREIGN PATENT DOCUMENTS

| | | | |
|---|---|---|---|
| CN | 105938443 | * | 9/2016 |
| WO | 2017011708 A1 | | 1/2017 |

OTHER PUBLICATIONS

Kr20200084735, English translation (Year: 2020).*

(Continued)

*Primary Examiner* — Insun Kang
(74) *Attorney, Agent, or Firm* — Davis Wright Tremaine LLP

(57) ABSTRACT

A computing resource services provider receives user diagnostics comprising analysis operations to be performed on one or more computing resources. The computing resource services provider monitors resources indicated by the user diagnostics. When one or more computing resources exceed a threshold value or otherwise indicate abnormalities in computing resource usage, the computing resource services provider performs one or more analysis operations to determine one or more causes for increased computing resource usage. Results of the one or more analysis operations are presented to a user once the computing resource services provider completes the one or more analysis operations.

19 Claims, 8 Drawing Sheets

(56) References Cited

U.S. PATENT DOCUMENTS

2021/0294597 A1* 9/2021 Nasu .................. G06F 8/77

OTHER PUBLICATIONS

CN 103098027, Eng text (Year: 2013).*
Zhang, WO 2018001269, Eng translation (Year: 2018).*
International Search Report and Written Opinion for Patent Application No. PCT/US2021/051606 filed Sep. 22, 2021, and mailed Dec. 13, 2021.

* cited by examiner

ASSISTED DETECTION OF APPLICATION PERFORMANCE ISSUES USING SERVERLESS COMPUTE TEMPLATES

BACKGROUND

Increased availability of computing resources as a service has led to growing use of remote computing resource services providers to perform software application hosting for a plurality of user software applications. These users do not have direct physical access to and control of hardware and software resources used to facilitate hosting of their own software applications. When and if application performance issues arise, computing resource service providers generally provide access to logging and other resource usage data to facilitate determination of the cause of said performance issues. However, customers often are unable to effectively use this logging and resource usage data, and resort to use of multiple tools to get complete observability of resource use across their applications. This use of multiple tools by customers can be expensive, complex, inconsistent, and often increases mean time to resolution of application performance issues.

BRIEF DESCRIPTION OF THE DRAWINGS

Various techniques will be described with reference to the drawings, in which.

DETAILED DESCRIPTION

Figure 1:
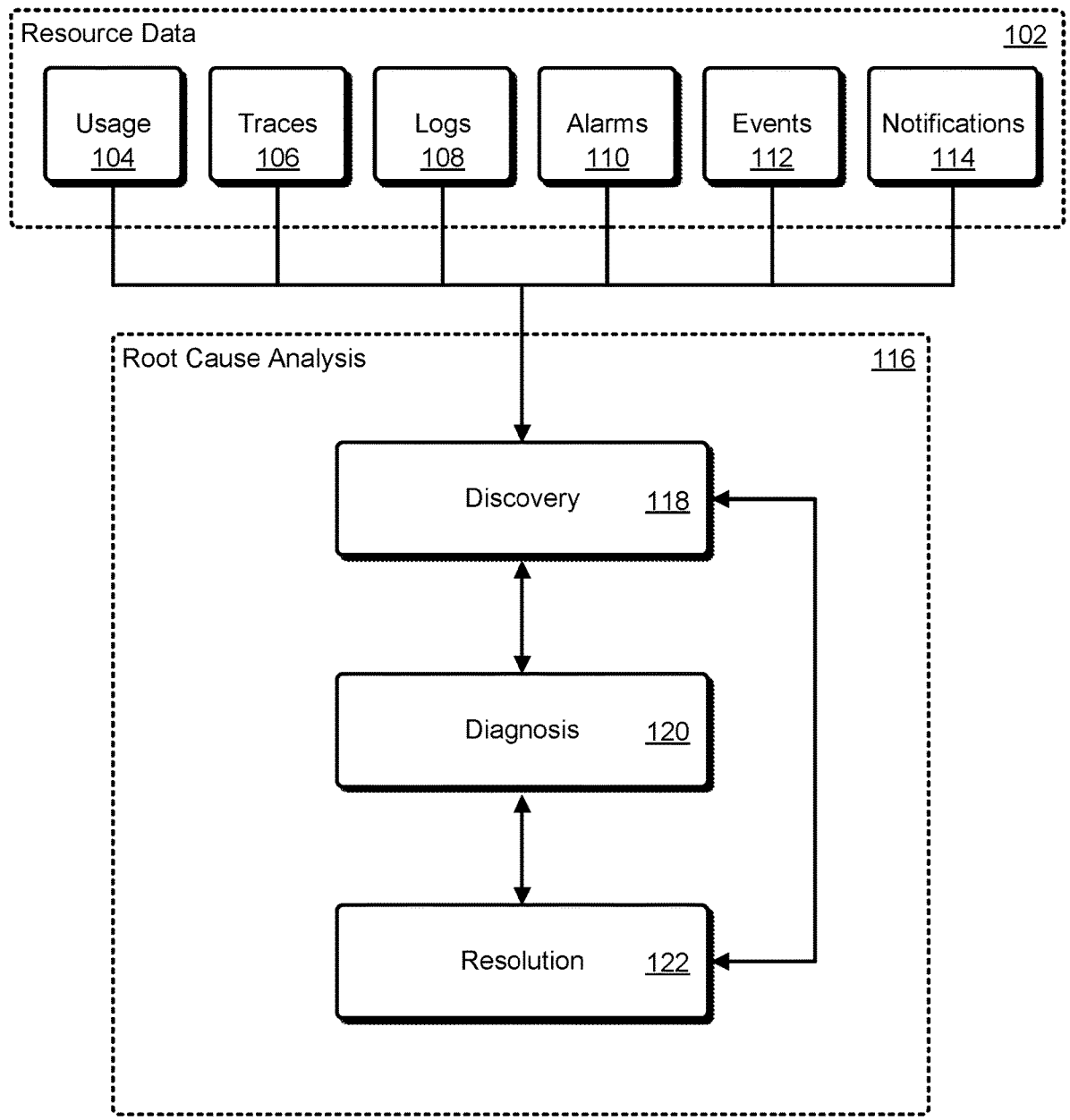
FIG. 1 illustrates an example process for automated determination of a root cause of system and application performance problems.

The present document describes various systems and methods to facilitate identification of one or more root causes of performance issues related to applications hosted by a computing resource services provider based, at least in part, on user-supplied diagnostics. Root cause analysis identifies, in an application hosted by a computing resources services provider or any other application hosting services, one or more key issues causing a decrease in application performance or other application behavior. Root cause analysis may additionally provide suggested solutions to improve application performance or facilitate automated resolution of issues related to decreased application performance. To improve generalizability of root cause analysis to diverse applications being executed by a computing resource service provider, the platform described herein introduces user-supplied diagnostics to define key limitations and resources related to a specific application.

The user-supplied diagnostics described herein allow for application providers to indicate specific analysis operations to be performed on specific resources as well as time windows on which analysis is to be performed in order to improve mean time to resolution of application performance issues. Identification of one or more root causes related to application performance issues is accomplished, in some examples, by a platform that facilitates creation, configuration, and automation of user-supplied diagnostics to analyze performance issues related to applications and underlying computing resource infrastructure. These user-supplied diagnostics allow a root cause identification platform to collect, aggregate, and highlight key data and insights related to application performance issues.

Traditionally, customers utilize a plurality of tools to identify causes of application performance issues, such as log management tools, metrics tools, and alarm and incident management tools. This plurality of tools potentially allows users complete observability of potential causes of application performance degradation. However, customer use of a plurality of tools increases mean time to identify and resolve root causes of reduced application performance while increasing costs and complexity of root cause identification.

Root cause analysis requires identification of issues across highly distributed application infrastructure utilized by various customers, with issue patterns that may be customer specific and potentially traverse various resources of the distributed application infrastructure. In addition, customers constantly iterate on and deploy new changes to their applications and update computing resource infrastructure used. Deploying a root cause analysis solution that identifies a pattern for one application configuration may not be effective for future application deployments. Consequently, root cause analysis solutions must be able to adapt to constantly changing user application infrastructure as well as ensure that correct performance or resource data is analyzed.

In order to address complexities described above, techniques and methods described herein to perform root cause analysis rely on user-supplied diagnostics. As described above, a user has one or more applications hosted by or otherwise utilizing resources of a computing resource services provider. These applications change or iterate over time. Because of these changes over time, detection of one or more root causes of performance issues that arise due to application resources or computing resource services provider resources cannot be performed without use of multiple third-party tools. These third-party tools may not account for changes to user applications in their resource analysis. User-supplied diagnostics allow for application developers or owners to customize root cause analysis to various application iterations and resources used by those iterations.

To begin, root cause analysis performed by systems and methods described herein utilizes an application programming interface (API) provided by a computing resource services provider. This API implements or otherwise provides system calls to indicate data analysis windows, functions, and resource monitoring, or any other functionality related to root cause analysis. A user, application developer, or application owner implements one or more user-supplied diagnostics to be performed by a computing resource services provider for root cause analysis and identification of performance degradation causes. These user-supplied diagnostics, described below in conjunction with FIG. 3, comprise data values and software instructions implementing serverless compute functions to be performed by a serverless compute service. The user-supplied diagnostics contain data parameters and serverless compute functions used to specify what data or resources to monitor that are specifically used by an application, and what analysis operations to perform in order to identify one or more root causes of application performance degradation.

A computing resource services provider monitors computing resources indicated in the user-supplied diagnostics according to metrics also indicated in the user-supplied diagnostics. If a computing resource use passes a threshold value, or application performance degrades past a threshold value, a computing resource services provider implementing root cause analysis gathers data to perform root cause analysis. This data can correspond to a time window indicated in the user-supplied diagnostics.

Using data for a specific time window, root cause analysis on a computing resource services provider performs one or more analysis operations, which can also be indicated in user-supplied diagnostics or implemented by default by root cause analysis, in order to determine one or more root causes of application performance degradation. These analysis operations comprise at least an initial, or resource-specific analysis. Additional analysis operations may be performed as indicated by user-supplied diagnostics, as described below in conjunction with FIGS. 3 and 5.

After one or more analysis operations are applied to data for any specific time window indicated in user-supplied diagnostics, results are presented to a dashboard. A dashboard is a web or other interface provided or presented by a computing resource services provider comprising information about resources and analysis indicated or specified in user-supplied diagnostics. The dashboard indicates a root cause of application performance issues identified by one or more analysis operations indicated in user-supplied diagnostics or otherwise performed by default in root cause analysis. Optionally, a dashboard may include suggested remediation steps to be performed that address application performance issues. A dashboard may also comprise one or more buttons or other user feedback facilities to trigger remediation steps to be performed on a computing resource services provider.

While root cause analysis of application performance issues is used extensively for the purpose of illustration, it should be noted that the techniques described herein can be adapted other uses. For example, a platform for root cause analysis using user-supplied diagnostics is usable for analysis of other application issues arising from hosting by a computing resource services provider. Identification of root causes for application security issues, for example, is improved by the techniques described herein. A user creates diagnostics related to one or more analysis operations to identify application security issues, and the platform described herein monitors one or more user applications during runtime to identify root causes of security issues related to both the applications and the computing resources used by the applications. Techniques described herein can also be adapted for resolution of application performance issues with minimal or no user interaction. That is, the platform described herein may implement automated issue resolution using user-supplied diagnostics. These user-supplied diagnostics can, in an embodiment, indicate steps to take in order to resolve commonly, or previously, encountered root causes of application performance degradation. These steps would then be performed, by the platform described herein, without user invocation and automatically as specific root causes arise.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

An embodiment illustrating steps to perform root cause analysis using the techniques and methods herein is described below in conjunction with FIG. 1. An embodiment illustrating an architecture to perform root cause analysis is described below in conjunction with FIG. 2. An embodiment illustrating user-supplied diagnostics is described below in conjunction with FIG. 3. Several example embodiments to perform various steps or aspects of root cause analysis using the architecture of FIG. 2 are described below in conjunction with FIGS. 4-6. An example process to perform root cause analysis is provided below in conjunction with FIG. 7. For purposes of illustration regarding various embodiments further described below in conjunction with FIGS. 2-7, a computing resource provider is interchangeable with an application hosting provider or an application execution environment. An application is interchangeable with software. A computing system is interchangeable with a computing device. A client, client computer, client device, or any other client is type or use of a computing system. A server, server computer, server device, or any other server is a type or use of a computing system. A computing system is interchangeable with computer device. A service provider is interchangeable with a computing resources service provider.

Figure 2:
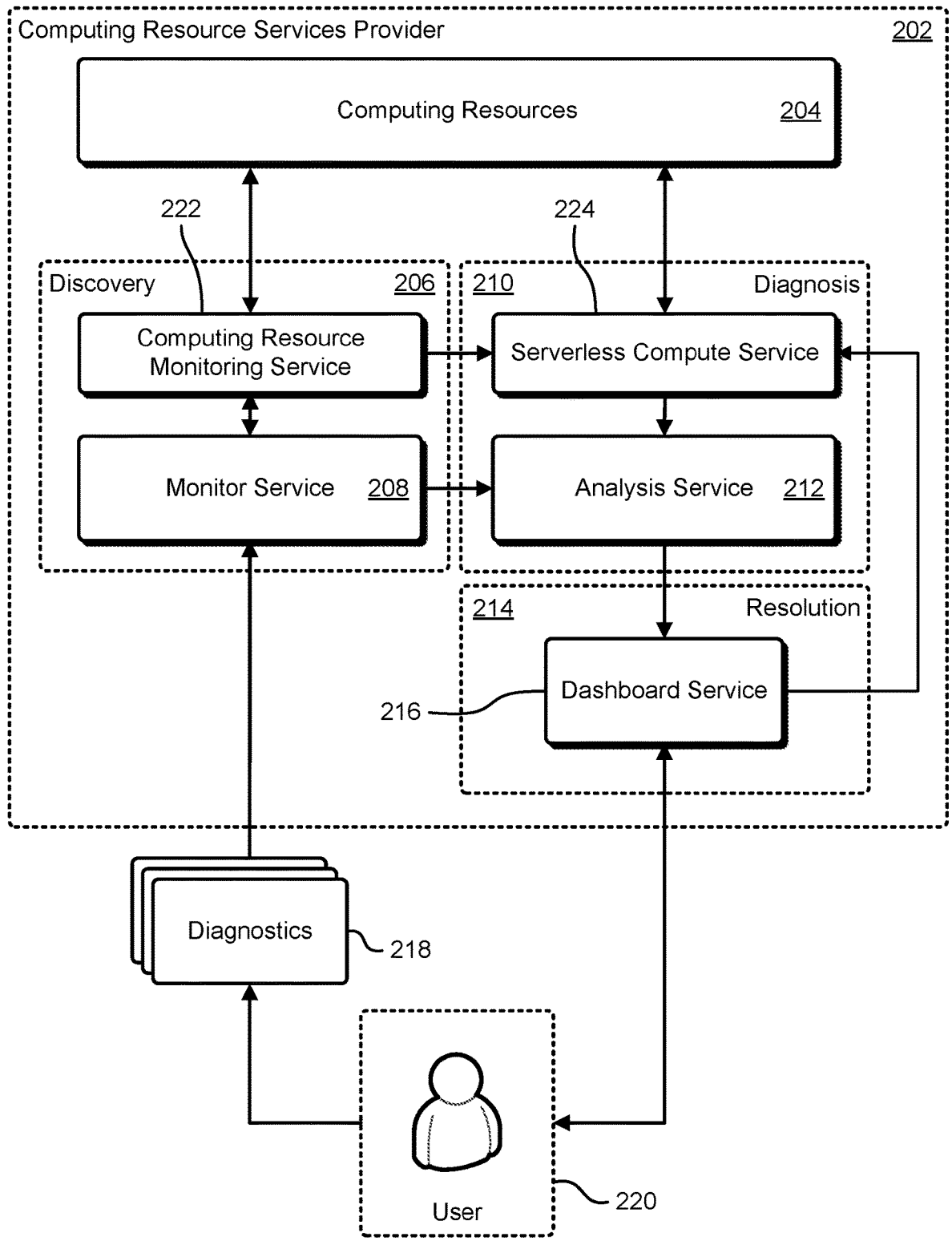
FIG. 2 illustrates an example architecture for performing root cause analysis by a computing resource services provider.

FIG. 1 illustrates an example process for automated determination of a root cause of system and application performance problems using root cause analysis 116. Root cause analysis 116 is a process implemented in software instructions that, when executed, gather data corresponding to one or more computing resources and apply one or more analysis operations to diagnose a likely cause of application performance degradation. Root cause analysis facilitates minimal input by administrators of a computing resource provider or application developers to identify one or more causes of application degradation.

Root cause analysis 116 comprises three overall operations implemented using systems, methods, and techniques described below in conjunction with FIGS. 2 and 4-6. First, root cause analysis 116 comprises discovery 118 operations. Discovery 118 operations are software instructions that, when executed, monitor one or more resources used by, or corresponding to, one or more applications to be monitored by a computing resource services provider.

Discovery 118 operations, described below in conjunction with FIGS. 2 and 4, discover issues related to application performance degradation by monitoring computing resources.

Computing resources are monitored, by discovery 118 operations, using performance or resource data 102 comprising usage 104 information, traces 106, logs 108, alarms 110, events 112, notifications 114, or any other information channels provided by a computing resource services provider. Performance data or resource data 102 represents data values comprising information about computing resources of a computing resource services provider, as further described below in conjunction with FIG. 2. Performance or resource data 102 comprises, in an embodiment, usage 104 information. Usage 104 information represents one or more data values indicating metrics or other numerical values associated with one or more computing resources. Performance or resource data 102 comprises, in an embodiment, traces 106. Traces 106 are data values comprising information about application execution or resource service execution, in an embodiment. In another embodiment, traces 106 comprise instructions executed and stored in memory associated with an application or service of a computing resource services provider.

Performance or resource data 102, in an embodiment, comprises logs 108. Logs are data values comprising recordings, console output, or any other metadata or information generated by applications or services performed by a computing resource services provider. Performance or resource data 102, in an embodiment, comprises alarms 110. Alarms 110 are data values comprising indications generated by a service of a computing resource services provider, in an embodiment. Performance or resource data 102, in an embodiment, comprises events 112. Events 112 are data values comprising one or more indications that an application or service has performed or encountered an operation, in an embodiment. Performance or resource data 102 comprises, in an embodiment, notifications 114. Notifications 114, in an embodiment, are data values comprising an indication that are triggered by an application or service performed by a computing resource services provider based on a condition, in an embodiment. Discovery 118 operations, in an embodiment, utilize any other information about resources provided by or associated with one or more services of a computing resource services provider.

A user of root cause analysis 116 provides user-supplied diagnostics, implemented as serverless compute functions. Serverless compute functions, in an embodiment, are collections of software instructions implementing a function that are performed by a serverless computing service of a computing resource services provider. These user-supplied diagnostics, described below in conjunction with FIGS. 2 and 3, indicate resources to be monitored by discovery 118 operations. Discovery 118 operations then utilize facilities provided by a computing resource services provider to identify anomalous use of specific computing resources. For example, discovery 118 operations monitor memory use associated with an application by using memory information related to overall or application-specific use by a computing resource services provider.

Root cause analysis 120 comprises diagnosis 120 operations. Diagnosis 120 operations are software instructions that, when executed, perform one or more default or user-specified analysis operations on a set of data associated with one or more applications being performed by a computing resource services provider, as further described below in conjunction with FIG. 5. Analysis operations, in an embodiment, are operations that perform queries, filtering, reduction, identification, or any other operations on a set of data in conjunction with or generated by one or more applications being performed by a computing resource services provider. Analysis functions are, in an embodiment, groups of analysis operations to perform queries, filtering, reduction, identification, or any other operations on a set of data in conjunction with or generated by one or more applications being performed by a computing resource services provider. Diagnosis 120 operations operate by first gathering data associated with degradation of application performance, and second, applying one or more analysis operations or functions to gathered data in order to identify one or more causes of degraded application performance. Data is gathered specific to computing resources indicated by user-supplied diagnostics, described below in conjunction with FIG. 3. The amount of data gathered for each computing resource is indicated by a time window, also specified in user-supplied diagnostics.

Diagnosis 120 operations then apply one or more analysis operations or functions on gathered data. These analysis operations or functions may be default analysis operations or functions specific to a given computing resource. Default analysis operations or functions are defined by a system implementing root cause analysis 116 and are not specified or implemented by a user in user-supplied diagnostics. Analysis operations or functions may also be user-supplied analysis operations or functions. User-supplied analysis operations or functions are defined in user-supplied diagnostics and use an application programming interface (API) provided by a computing resource services provider in order to facilitate identification of computing resource problems specific to an application. User-supplied analysis operations or functions comprises analysis operations or functions specific to a computing resource. User-supplied analysis operations or functions may also comprise analysis operations or functions specific to an abstraction of a computing resource, such as a grouping with related resources or a grouping with all other resources utilized by an application. Diagnosis 120 operations apply one or more analysis operations or functions to one or more sets of gathered data corresponding to one or more computing resources, and generate data indicating information about one nor more causes of application performance degradation.

Root cause analysis 116 also comprises resolution 122 operations. Resolution 122 operations are software instructions that, when executed, present root cause information identified by diagnosis 120 operations to one or more users. After diagnosis 120 operations identify one or more root causes of application performance degradation, resolution 122 operations present that information to one or more responsible parties able to perform remediation. Resolution 122 operations comprise at least an interface for displaying results from one or more analysis operations or functions performed during diagnosis 120. This interface may be a web interface, data stream, information feed, or any other technique for communication data or other information by a computing resource services provider. For example, an interface for presenting data related to one or more analysis operations or functions performed during diagnosis 120 is a web dashboard displaying reports of resource usage during specific time windows, as used by an application.

Resolution 122 or remediation operations may also comprise facilities to manage automated resolution of one or more issues identified by diagnosis 120 operations. These resolution operations are software instructions defined by a user in user-supplied diagnostics that, when executed, automatically resolve application performance issues for one or more identified causes. Resolution or remediation operations are, in another embodiment, software instructions defined by a computing resource service provider that, when executed, resolve frequent or easily resolved application performance issues related to one or more computing resources. Performance issues, in an embodiment, are indications of reduced performance corresponding to one or more computing resources determined from performance data, as described below in conjunction with FIG. 2. Resolution operations are optional and not required to perform root cause analysis 116. However, systems, methods, or techniques further described herein to perform root cause analysis 116 facilitate automated resolution of one or more causes of application performance degradation through user-supplied diagnostics comprising automated resolution instructions.

FIG. 2 illustrates an example architecture for performing root cause analysis by a computing resource services provider 202. A computing resource services provider 202 is a platform comprising one or more computing resources 204 provided as a service, as further described herein. A computing resource services provider facilitates application hosting using one or more computing resources 202 during application execution. Computing resources 204 are hardware and software components and resources provided by a computing resource services provider further described herein to perform software application hosting and execution services. During application execution, one or more computing resources 204 may cause application performance degradation. If application performance degrades, a computing resource services provider 116 performs or otherwise facilities root cause analysis to determine one or more causes of reduced application performance, as described above in conjunction with FIG. 1.

A user 220 facilitates root cause analysis for one or more applications by creating or otherwise providing diagnostics 218. A user 220 is an application developer, application creator, application owner, or other entity associated with one or more software applications being hosted or otherwise executed by a computing resource services provider 202. A user 220 is, in an embodiment, a system administrator or development operations (DevOps) engineer associated with a computing resource services provider 202. A user 220 is, in another embodiment, an application or software developer, a DevOps engineer, system administrator, or other entity associated with an application being hosted or otherwise executed using a computing resource services provider 202.

To perform root cause analysis using a computing resource services provider 202, a user 220 authors or otherwise provides diagnostics 218 implemented using serverless compute functions. Serverless compute functions are collections of software instructions to be performed by a serverless computing service 224 in a computing resource services provider. A serverless compute service 224 is, in an embodiment, data values and software instructions usable by a computing resource services provider to perform a computing service. A serverless compute service executes or otherwise runs user software applications or serverless compute functions, such as those implementing diagnostics 208, using computing resources 204 of a computing resource services provider 202. Serverless compute functions implementing diagnostics 218 comprise, in an embodiment, data values and/or software instruction to specify how root cause analysis is to be performed by a computing resource services provider 202. Serverless compute functions implementing diagnostics 218 comprise, in an embodiment, data values and/or software instructions to indicate one or more diagnostics provided by a computing resource services provider 202 to be utilized during root cause analysis. Serverless compute functions implementing diagnostics 218 may also comprise software instructions implementing one or more user-supplied analysis operations or functions to be performed during root cause analysis. Serverless compute functions implementing diagnostics 218 comprise data values or parameters indicating computing resources 204 to be monitored, time windows on which to perform one or more analysis operations or functions specified by one or more software instructions in said diagnostics 218, or other data values to facilitate root cause analysis by a computing resource services provider 202. Software instructions and/or data values provided in serverless compute functions implementing diagnostics 218, by a user 220, utilize an application programming interface (API) provided by a computing resource services provider 202, as described below in conjunction with FIGS. 4 and 8.

A computing resource services provider 202 comprises one or more software and/or hardware modules or components to perform steps of root cause analysis described above in conjunction with FIG. 1. To perform or otherwise facilitate root cause analysis, a computing resource services provider 202 comprises data values and/or software instructions that, when executed, perform discover 206, diagnosis 210, and resolution 214 in conjunction with one or more user 220 applications and user-supplied diagnostics 218.

To perform discovery 206, as described above in conjunction with FIG. 1, a computing resource services provider 202 comprises a monitor service 208 using a computing resource monitoring service 222. A computing resource monitoring service 222 is a service provided by a computing resource services provider 202, in an embodiment, where performance or resource data is collected by said computing resource monitoring service about one or more computing resources 204. A monitor service 208 performs performance monitoring. Performance monitoring is identification of one or more aspects of one or more computing resources 204 related to use or performance of those one or more computing resources 204 provided by a computing resource monitoring service 222. Performance monitoring, in an embodiment, detects application performance degradation using performance data. Performance data, in an embodiment, is data collected by a computing resource monitoring service 222 or other service of a computing resource services provider 202. In another embodiment, performance data is log data generated by one or more software applications performed by or using resources 204 of a computing resource services provider 202. Performance data, in an embodiment, comprises one or more usage values. Usage values are, in an embodiment, data values indicating usage of one or more computing resources 204 by a computing resource monitoring service 222 or other service of a computing resource services provider 202. Performance data, in an embodiment, is associated with a time value. A time value is a data value indicating a time during which or at which one or more items of performance data were generated, created, received, or otherwise obtained. A computing resource monitoring service 222 receives, in an embodiment, one or more triggers indicating application performance degradation. A trigger or triggering event is an indication that one or more performance thresholds have been violated. A performance threshold, in an embodiment, is one or more numerical values indicating upper or lower limits on computing resource 204 use or performance. A performance threshold is violated if computing resource 204 use or performance meets and/or exceeds the one or more numerical values indicating upper limits on use or performance of the computing resource 204, in an embodiment. In another embodiment, a performance threshold is violated if computing resource 204 use or performance meets and/or falls below the one or more numerical values indicating lower limits on use or performance of the computing resource 204. If a performance threshold for one or more computing resources is violated, those computing resources have degraded performance, in an embodiment. In an embodiment, degraded performance indicates that computing resource 204 use or performance meets and/or exceeds a performance threshold. In another embodiment, degraded performance indicates that computing resource 204 use or performance meets and/or falls below a performance threshold. A monitor service 208, in an embodiment, is data values and/or software instructions that, when executed, monitor one or more computing resources 204 associated with one or more user 220 applications as indicated by user-supplied diagnostics 218. A monitor service 208, in an embodiment, utilizes a computing resource monitoring service 222 to observe, monitor, record, or otherwise access data and/or metrics about one or more computing resources 204. A monitor service 208, in an embodiment, provides or otherwise utilizes an API to a computing resource monitoring service 222 to indicate one or more computing resources 204 to be monitored. A monitor service 208 determines one or more computing resources 204 to monitor for anomalous activity or activity that may degrade performance of one or more software applications based, at least in part, on diagnostics 218. Diagnostics 218, described above and below in conjunction with FIG. 3, are received by a monitor service 208 or other component of a computing resource services provider 202 from a user 220.

A monitor service 208 performs diagnostics on, or otherwise monitors, one or more computing resources 204 provided by a computing resource services provider 202. A monitor service 208 utilizes performance data about one or more computing resources 204, such as alarms, events, messages, and other information generated by a computing resource services provider 202 implementing a computing resource monitoring service 222 to observe or otherwise monitor one or more computing resources 204. If, in an embodiment, performance data indicates application use or consumption of one or more computing resources increases past a performance threshold value, or decreases below a performance threshold value, indicated in diagnostics 218, a monitoring service 208 indicates a triggering event and a computing resource services provider 202 begins diagnosis 210. In another embodiment, if a monitor service 208 determines, using performance data, that application performance degrades past a performance threshold value indicated in diagnostics 218, a computing resource services provider 202 begins diagnosis 210. If a monitor service 208 utilizing a computing resource monitor service 222 indicates a triggering event, the computing resource monitoring service 222, in an embodiment, invokes one or more serverless compute service 224 operations such as those performed by an analysis service 212.

To perform diagnosis 210, as described above in conjunction with FIG. 1, a computing resource services provider 202 further comprises an analysis service 212. An analysis service 212, in an embodiment, is data values and/or software instructions that, when executed, gather data and metrics relevant to one or more analysis operations or functions to be performed, and perform said analysis operations or functions. An analysis service 212, in an embodiment, is performed by a computing resource services provider 202 using a serverless compute service 224 in response to a triggering event by a monitor service 208. In another embodiment, an analysis service 212 is performed by a computing resource services provider 202 using a serverless compute service 224 in response to a request by a user 220.

A serverless compute service 224 is, in an embodiment, data values and software instructions usable by a computing resource services provider 202 to perform a computing service. A serverless compute service 224 executes or otherwise runs user software applications or other user code using computing resources 204 of a computing resource services provider 202. A serverless compute service 224, in an embodiment, executes one or more sets of software instructions from user-supplied diagnostics 218. In an embodiment, a serverless compute service 224 supports one or more sets of software instructions implemented using one or more software programming languages described herein. A serverless compute service 224 performs cloud functions to facilitate interaction between one or more software programs executed by a serverless compute service 224 and one or more other services implemented by a computing resource services provider 202, such as a computing resource monitoring service 222.

A serverless compute service 224 comprises one or more software programs implemented or otherwise defined in user-supplied diagnostics 218, in an embodiment. In another embodiment, a serverless compute service 224 comprises one or more software programs transferred to a computing resource services provider 202 over a network. In another embodiment, a serverless compute service 224 comprises utilities to author or otherwise create one or more software programs to be executed by said serverless compute service 224.

A serverless compute service 224 receives, in an embodiment, triggers from one or more other services of a computing resource services provider 202. A trigger is an indication that one or more performance thresholds have been violated, as described above. A serverless compute service 224 executes one or more software programs upon receiving one or more triggers or indications from one or more other services provided by a computing resource services provider. For example, a computing resource monitoring service 222 indicates or otherwise triggers a serverless compute service 224 when computing resource 204 use passes a performance threshold, and the serverless compute service 224 executes or otherwise runs one or more software analysis operations or functions defined or implemented in user-supplied diagnostics 218, as described herein.

An analysis service 212, further described below in conjunction with FIG. 5, performs one or more analytical techniques to determine one or more root causes of application performance degradation. An analysis service 212 comprises multi-level diagnostic or analysis operations and/or functions. One or more users 220 determine, by indicating in diagnostics 218, which diagnostic or analysis operations and/or functions are to be performed during root cause analysis by a computing resource services provider 202.

Analysis operations and/or functions to be performed by an analysis service 212 hosted or otherwise performed by a computing resource services provider 202 comprise multiple levels. First degree analysis operations and/or functions focus on a time window or time slice, as well as resource-specific data, as indicated in user-supplied diagnostics. Second degree analysis operations and/or functions focus on examining dependent computing resources 204 to those computing resources 204 indicated or implicated by first degree analyses. Third degree analysis operations and/or functions focus on specific computing resource 204 groups implicated by first and second degree analysis operations and/or functions. Additional analytical abstractions may be provided by a user 220 through user-supplied diagnostics 218 that further abstract into a broader window of computing resources for analysis. One or more analysis operations and/or functions having one or more degrees or levels are performed by an analysis service 212 to facilitate diagnosis 210 of one or more root cause issues impacting application performance. Once those root cause issues are identified, a dashboard agent 216 facilitates communication of those issues to a user 220 for resolution 214.

To perform resolution 214, as described above in conjunction with FIG. 1, a computing resource services provider 202 comprises a dashboard agent 216. A dashboard agent 216 is data values and/or software instructions that, when executed by a computing resource services provider, present information related to one or more root cause issues identified by an analysis service 212. A dashboard agent 216, in an embodiment, comprises a dashboard interface to present data related to one or more root cause issues. A dashboard interface is, in an embodiment, a user interface usable to present data related to one or more root cause issues. In an embodiment, a dashboard interface is a web interface. A web interface, in an embodiment, is a user interface presented by an Internet browser or otherwise presentable over a network by a computing resource services provider or a frontend associated with a service of a computing resource services provider. In another embodiment, a dashboard agent 216 comprises generated reports to be transmitted or otherwise communicated to one or more users 220.

A dashboard agent 216 generates visual representations, such as graphs, of data associated with one or more root cause issues identified by an analysis service 212 performed by a computing resource services provider 202. In an embodiment, a dashboard agent 216 provides user-feedback mechanisms to receive user 220 input associated with one or more analysis operations or functions performed by an analysis service 212. In another embodiment, a dashboard agent 216 receives user input to perform one or more groups of software instructions to remediate one or more issues identified by a computing resource services provider 202 during root cause analysis. Software instructions to remediate one or more issues identified by a computing resource services provider 202 during root cause analysis are, in an embodiment, determined by or provided by said computing resource services provider 202 to remediate common causes of application performance degradation. In another embodiment, software instructions to remediate one or more issues identified by a computing resource services provider 202 during root cause analysis are provided by a user 220 through diagnostics 218.

Figure 3:
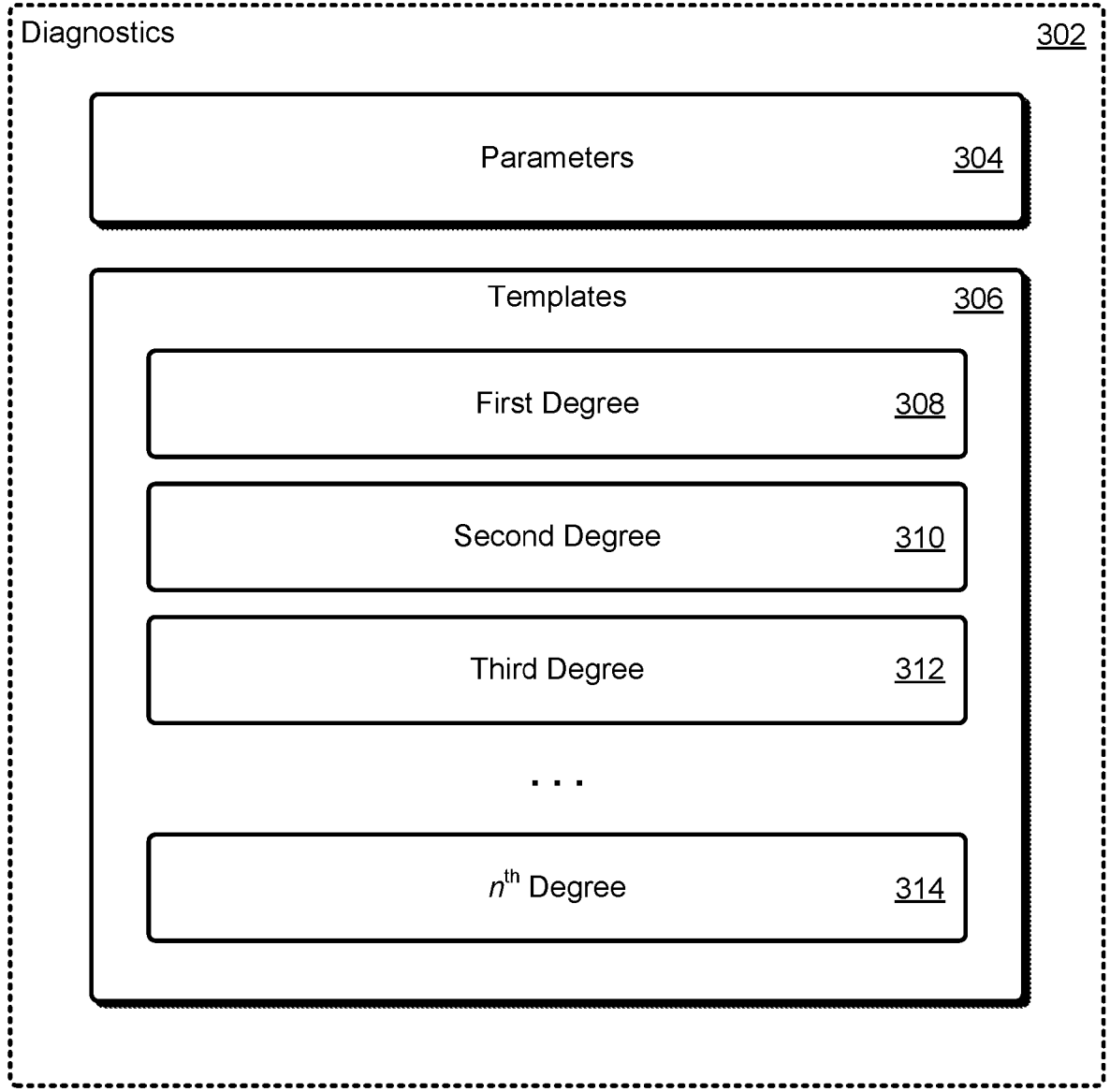
FIG. 3 illustrates an example of user-defined diagnostics to facilitate root cause analysis.

FIG. 3 illustrates an example of user-defined diagnostics 302 to facilitate root cause analysis, as described above. Diagnostics 302 are data values and/or software instructions to define parameters and analysis operations and/or functions to be performed by a computing resource services provider during root cause analysis. Diagnostics 302 are curated, or user-defined and/or supplied by one or more users as described above in conjunction with FIG. 2. Diagnostics 302 comprise software instructions implementing serverless compute functions performing application programming interface (API) calls to configure, define, or otherwise organize parameters 304 and templates 306 associated with root cause analysis performed by a serverless compute service of a computing resource services provider.

Diagnostics 302 comprise parameters 304. Parameters 304 are data values usable to configure root cause analysis by a computing resource services provider. Parameters 304 define computing resources to be monitored by a computing resource services provider. Parameters 304 also define time slices or time windows used to narrow down data pools related to computing resources to be analyzed by a computing resource services provider. Parameters 304, in an embodiment, indicate one or more analysis operations and/or functions provided by a computing resource services provider to perform root cause analysis. In another embodiment, parameters 304 indicate one or more remediation operations or techniques provided by a computing resource services provider to fix or otherwise address root cause issues related to application performance degradation. Remediation operations, in an embodiment, are software instructions that, when executed or otherwise performed by a computing resource services provider, make one or more changes to an application or computing resources used by an application in order to increase or decrease use or performance in conjunction with a performance threshold, as described above.

Diagnostics 302, in an embodiment, comprise templates 304. Templates 304 are software instructions implementing serverless compute functions, where those serverless compute functions are usable to perform one or more analysis operations or functions, or one or more remediation operations or functions, by a serverless compute service of a computing resource services provider during root cause analysis, as described above in conjunction with FIG. 2. Templates 304 implementing serverless compute functions comprise, in an embodiment, API function calls to one or more APIs provided by a computing resource services provider. In another embodiment, templates 304 implementing serverless compute functions comprise software instructions to manipulate, analyze, or otherwise use data provided by a computing resource services provider.

Templates 306 implement one or more analysis operations or functions usable to facilitate root cause analysis by a computing resource services provider. One or more analysis operations or functions specified, defined, or otherwise implemented in templates 306 are specific to one or more user applications, in an embodiment. In another embodiment, one or more analysis operations or functions specified, defined, or otherwise implemented in templates 306 perform general analysis related to one or more computing resources provided by a computing resource services provider. One or more analysis operations or functions specified, defined, or otherwise implemented in templates 306 utilize one or more API calls provided by a computing resource services provider.

Templates 306, in an embodiment, implement one or more remediation techniques usable to fix or otherwise alleviate application performance degradation without further user input. Remediation operations specified, defined, or otherwise implemented in templates 306 are specific to issues that cause performance degradation in a user application, in an embodiment. Remediation operations specified, defined, or otherwise implemented in templates 306, in another embodiment, are specific to general performance degradation issues related to computing resources in a computing resource services provider.

One or more templates 306 indicated in diagnostics 302 are organized, in an embodiment, into a hierarchy comprising degrees 308, 310, 312, 314 of analysis or remediation. First degree 308 analysis or remediation operations are specific to a time window or time slice indicated in parameters 304 of diagnostics 302, or specific to computing resources indicated by parameters 304 or otherwise by diagnostics 302. For example, first degree 303 analysis or remediation operations may focus on specific memory configurations associated with a user application. Second degree 310 analysis or remediation operations are specific to resources dependent to those specified in the first degree 308 category. For example, analysis or remediation operations for databases and/or computing servers providing resources specified in the first degree 308 category are organized as second degree 310 analysis or remediation templates 306.

Third degree 312 analysis or remediation operations are specific to resource groups or application groups to which computing resources associated with first 308 and second 310 degree analysis or remediation operations belong. For example, server clusters or network clusters comprising computing resources providing database, computation, memory, or other resources analyzed by first 308 and second 310 degree analysis or remediation templates 306 are categorized as third degree 312. In addition to three degrees 308, 310, 312 of categorization for templates 306, further abstraction of computing resources utilized for analysis and/or remediation by templates 306 is categorized up to an $n^{th}$ degree 314 of grouping. Categorization or grouping up to an $n^{th}$ degree 314 is specified by a user, as described above in conjunction with FIG. 2.

Figure 4:
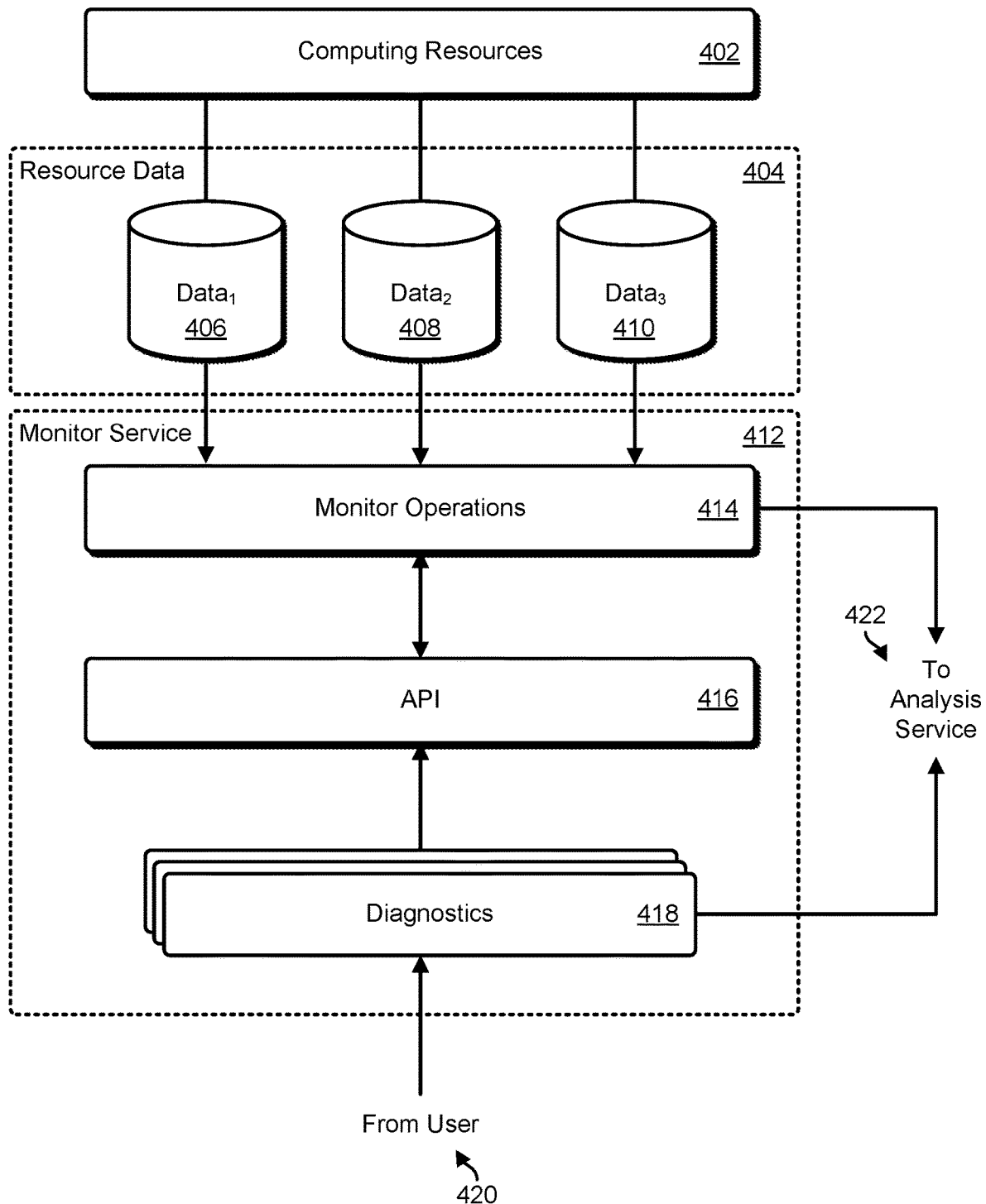
FIG. 4 illustrates an example architecture for monitoring usage data of one or more computing resources based on user-defined diagnostics.

FIG. 4 illustrates an example architecture for monitoring performance or resource data 404 of one or more computing resources 402 based on user-defined diagnostics 418. A monitor service 412, as described above in conjunction with FIG. 2, receives diagnostics 418, as described above in conjunction with FIGS. 2 and 3, from a user 420. Diagnostics 418 utilize an application programming interface (API) 416 provided by a monitor service 412 or generally by a computing resource services provider to indicate one or more computing resources 402 to be monitored by monitor operations 414 of said monitor service 412.

Diagnostics 418 define or otherwise indicate, as parameters or by API 416 calls, one or more computing resources 402. A monitor service 412 receives data 406, 408, 410, as described above in conjunction with FIG. 1, indicating current usage associated with one or more computing resources 402 indicated or otherwise defined by user-supplied diagnostics 418. A monitor service 412 requests specific performance or resource data 404 for each computing resource 402 indicated by user-supplied diagnostics 418.

While an application is hosted, performed, or otherwise executed by a computing resource services provider, computing resources 402 associated with that application, as indicated by diagnostics 418, are monitored by monitor operations 414 of a monitoring service 412. Monitor operations 414 used by a monitoring service 412 are software instructions that, when executed, observe one or more data items 406, 408, 410 indicating information about computing resources, described above in conjunction with FIG. 1. If performance or resource data 404 indicates computing resource 402 use or other information indicating degraded application performance, as specified by diagnostics 418, a monitor raises an indication to an analysis service 422, described above in conjunction with FIG. 2 and below in conjunction with FIG. 5.

Degraded application performance or computing resource 402 usage is indicated by one or more threshold values. One or more threshold values, in an embodiment, are predetermined by a computing resource services provider implementing or otherwise performing root cause analysis. In another embodiment, one or more threshold values are defined or otherwise provided by user-supplied diagnostics, including threshold values specific to one or more computing resources 402 used by one or more specific user applications. When a threshold computing resource data 406, 408, 410 is observed or monitored by monitor operations 414 of a monitor service 412, an indication is made to an analysis service 422 to perform one or more analysis operations or functions defined by user-supplied diagnostics 418 or otherwise provided by root cause analysis performed or implemented by a computing resource services provider.

Figure 5:
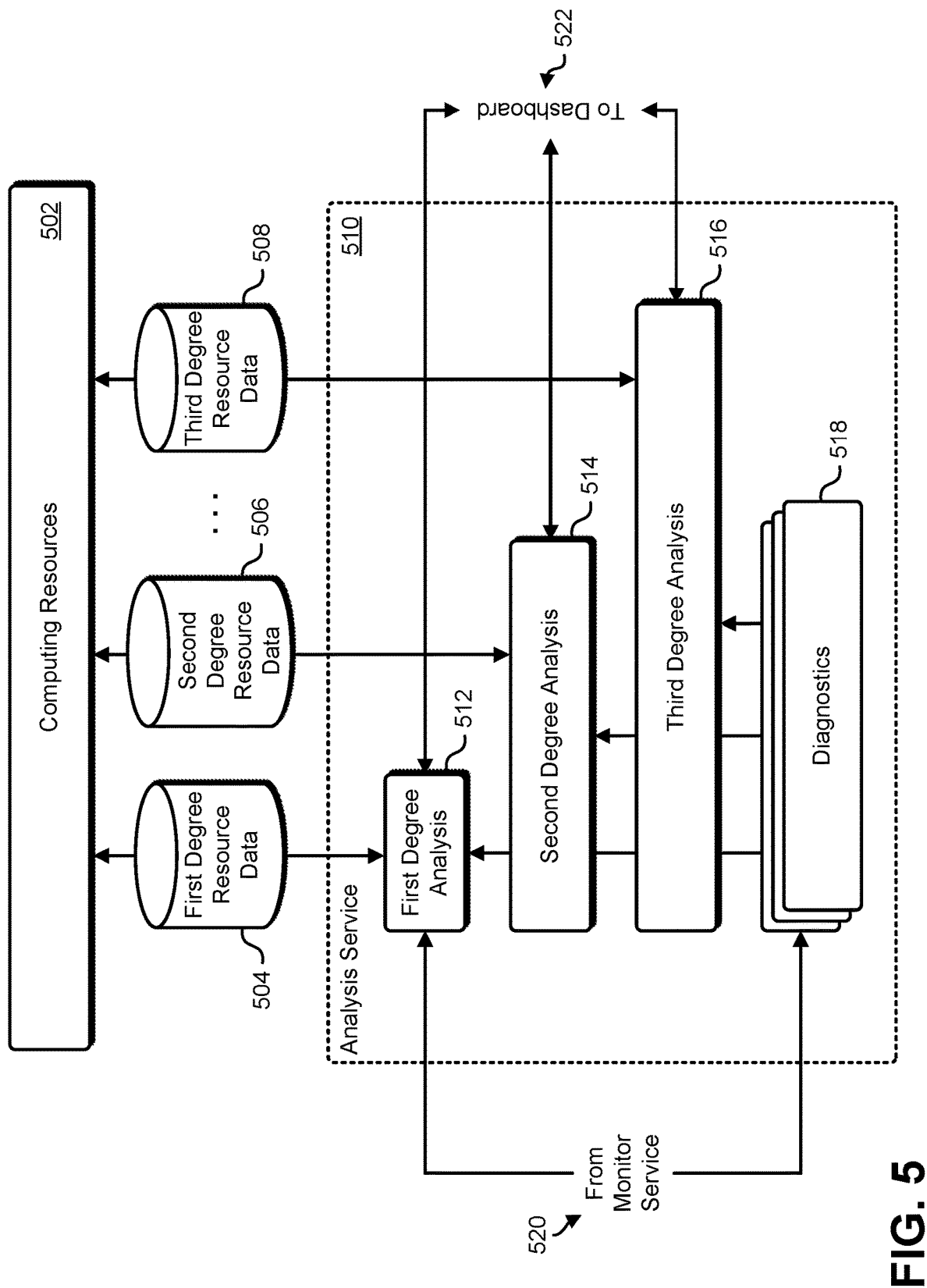
FIG. 5 illustrates an example architecture for performing one or more analysis operations of computing resource data according to user-defined diagnostics.

FIG. 5 illustrates an example architecture for performing one or more analysis 512, 514, 516 operations of computing resource 502 data 504, 506, 508 according to user-defined diagnostics 518. An analysis service 510, as described above in conjunction with FIG. 2, receives from a monitor service 520, an indication to perform one or more analysis 512, 514, 516 operations as a result of a threshold value being observed indicating computing resource 502 usage causing degraded application performance. An analysis service 510 receives user-supplied diagnostics 518 from a monitor service 520 comprising one or more analysis 512, 514, 516 techniques to be performed. An analysis service 510, in an embodiment, uses performance or resource data 504, 506, 508 comprising information about one or more computing resources 502. Performance or resource data 504, 506, 508 comprises first degree performance or resource data 504. First degree performance or resource data 504, in an embodiment, is data comprising information associated with computing resources 502 to be analyzed by first degree analysis 512 operations, as described below. Performance or resource data 504, 506, 508 comprises second degree performance or resource data 506. In an embodiment, second degree performance or resource data 506 is data comprising information associated with one or more computing resources 502 to be analyzed by second degree analysis 514 operations, as described below. Performance or resource data 504, 506, 508 comprises third degree performance or resource data 508. In an embodiment, third degree performance or resource data 508 is data comprising information associated with one or more computing resources 502 to be analyzed by third degree analysis 516 operations, as described below. In another embodiment, performance or resource data 504, 506, 508 comprises data associated with one or more computing resources 502 usable by additional $n^{th}$ degree analysis operations and/or functions, as described above in conjunction with FIG. 3.

An analysis service 510, upon indication by a monitor service 520, gathers computing resource 502 data 504, 506, 508 according to resources indicated by user-supplied diagnostics 518. In an embodiment, an analysis service 510 gathers computing resource 502 data 504, 506, 508 for a time slice or time window indicated, defined, or otherwise specified by user-supplied diagnostics 518. For example, if user-supplied diagnostics 518 indicate a time slice or time window of one hour, computing resource 502 data 504, 506, 508 comprising information related to a previous hour are gathered by an analysis service 510. In another embodiment, an analysis service 510 gathers computing resource 502 data 504, 506, 508 for a time slice or time window predetermined by a computing resource services provider implementing or otherwise performing root cause analysis, where said time slice or time window is specific to an effective or representative amount of computing resource 502 data 504, 506, 508 usable for performing one or more analysis 512, 514, 516 techniques to determine a root cause of application performance degradation. In another embodiment, an analysis service 510 gathers computing resource 502 data 504, 506, 508 using any other method or technique to indicate a subset of computing resource 502 data 504, 506, 508 to be analyzed by an analysis service 510.

Once an analysis service 510 has gathered computing resource 502 data 504, 506, 508 according to user-supplied diagnostics 518 or predetermined time slices or time windows determined by a computing resource services provider implementing or otherwise performing root cause analysis, said analysis service 510 performs one or more analysis operations or functions 512, 514, 616 on said computing resource 502 data 504, 506, 508. One or more analysis 512, 514, 516 techniques or operations to perform root cause analysis in order to identify one or more causes of application performance degradation are, in an embodiment, predetermined or predefined by a computing resource services provider implementing or otherwise performing root cause analysis. In another embodiment, one or more analysis 512, 514, 516 techniques or operations to perform root cause analysis in order to identify one or more causes of application performance degradation are defined by one or more users in user-supplied diagnostics 518, as described above in conjunction with FIGS. 2 and 3.

An analysis service 510 performs one or more degrees of analysis 512, 514, 516, as described above in conjunction with FIGS. 2 and 3. An analysis service 510 performs at least one or more first degree analysis 512 operations and/or functions. As described above, first degree analysis 512 operations and/or functions are analysis operations or comprise analysis operations specific to one or more computing resources 502 used by an application having degraded application performance as indicated in user-supplied diagnostics 518 or determined, by a computing resource services provider, to commonly cause degraded application performance by applications hosted or otherwise performed by said computing resource services provider.

In addition to one or more first degree analysis 512 operations and/or functions, an analysis service 510 performs, in an embodiment, one or more second degree analysis 514 operations and/or functions. In another embodiment, an analysis service 510 performs no second degree analysis 514 operations and/or functions, due to identification of a root cause of application performance degradation by first degree analysis 512 operations and/or functions or by an analysis service having no available second degree analysis 514 operations and/or functions, such as when no second degree analysis 514 operations and/or functions are provided by user-supplied diagnostics or a computing resource services provider performing or otherwise implementing root cause analysis has no second degree analysis 514 operations and/or functions to perform. Third degree analysis 516 operations and/or functions, either from user-supplied diagnostics 518 or by a computing resource services provider implementing or otherwise performing root cause analysis, are performed, in an embodiment, to facilitate detection of one or more root causes of application performance degradation. In another embodiment, no third degree analysis 516 operations and/or functions are performed.

If one or more first degree analysis 512 operations and/or functions identify a root cause, in an embodiment, information related to computing resources 502 and computing performance or resource data 504, 506, 508 is provided, by an analysis service 510, to a dashboard 522. If one or more first degree analysis 512 operations and/or functions are unable to determine a root cause of application performance degradation, in an embodiment, information related to computing resources 502 and computing performance or resource data 504, 506, 508 determined by one or more second degree analysis 514 operations and/or functions is provided, by an analysis service 510, to a dashboard 522. If one or more first degree analysis 512 operations and one or more second degree analysis 514 operations and/or functions are unable to determine a root cause of application performance degradation, in an embodiment, information related to computing resources 502 and computing performance or resource data 504, 506, 508 determined by one or more third degree analysis 516 operations and/or functions is provided, by an analysis service 510, to a dashboard 522. In another embodiment, information related to computing resources 502 and computing performance or resource data 504, 506, 508 is provided, by an analysis service 510, to a dashboard 522 regardless of whether any of the first degree analysis 512 operations and/or functions, second degree analysis 514 operations and/or functions, or third degree analysis 516 operations and/or functions are able to individually identify a root cause of application performance degradation.

If user-supplied diagnostics 518 indicate one or more additional levels or degrees of analysis operations and/or functions to be performed, as described above in conjunction with FIG. 3, to facilitate root cause analysis, an analysis service 510 performs said additional levels or degrees of analysis. If one or more additional levels or degrees of analysis indicate information relevant to root cause analysis of application performance degradation, said information is provided, by an analysis service 510, to a dashboard 522.

Figure 6A:
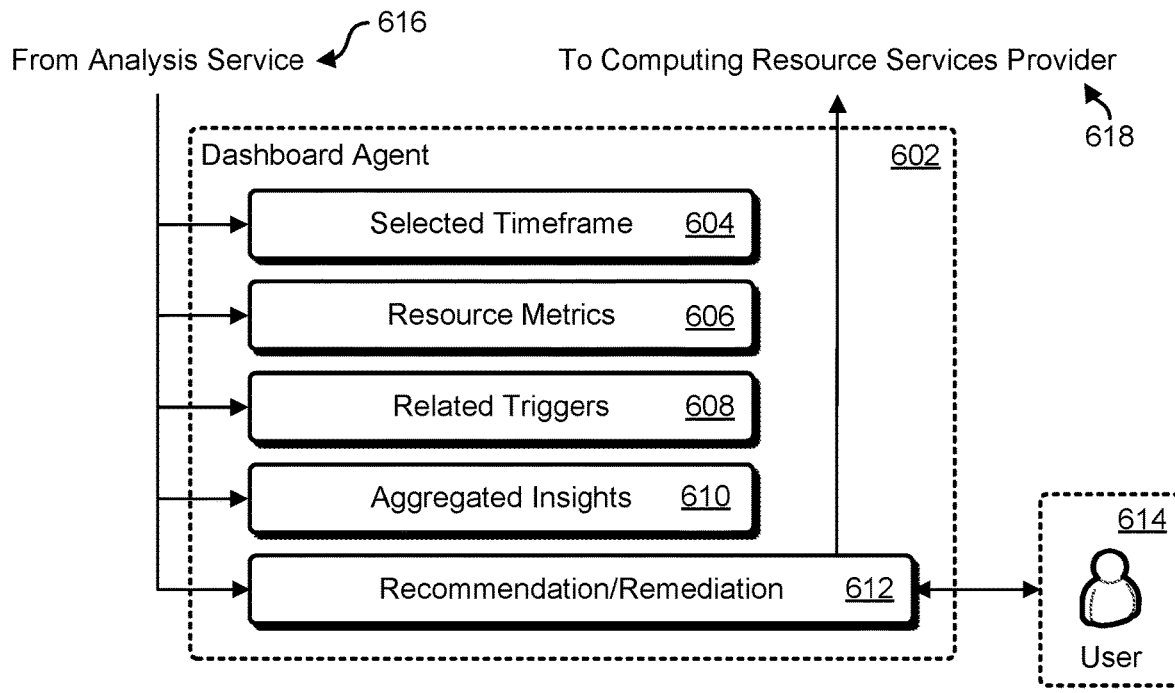
FIG. 6A illustrates an example dashboard architecture to facilitate presentation of information about one or more root cause issues to a user.
Figure 6B:
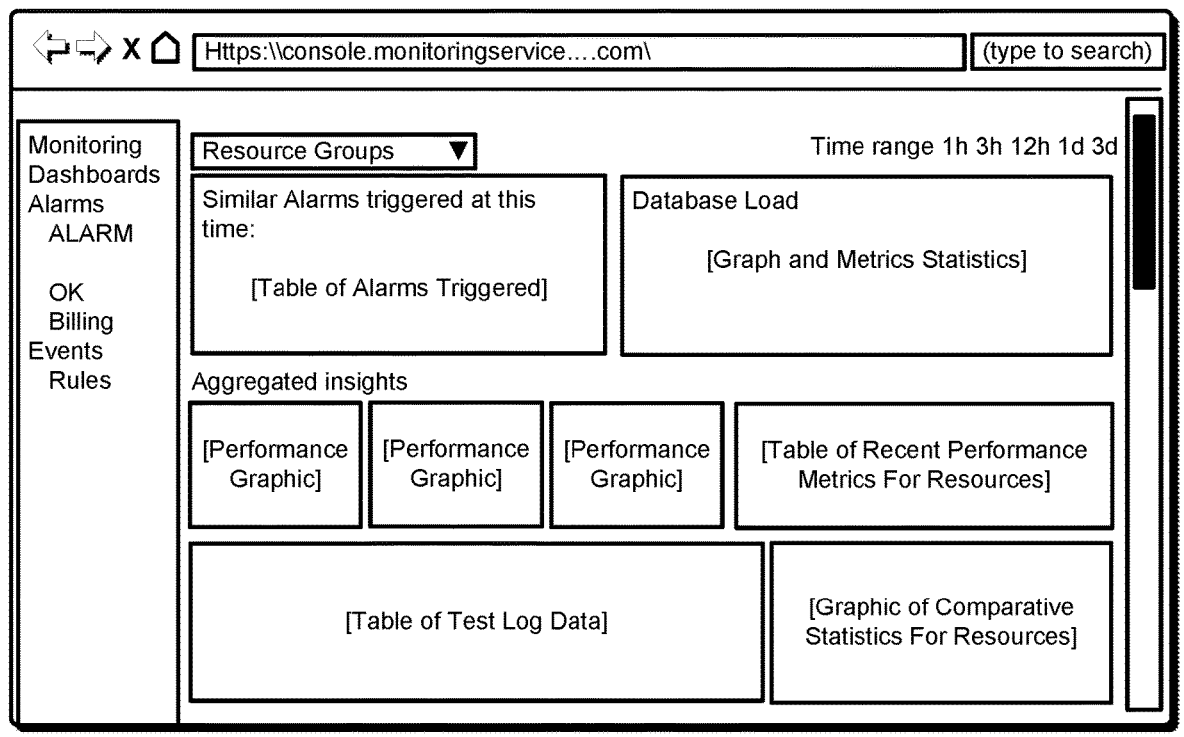
FIG. 6B illustrates an example dashboard interface using a web browser.

FIG. 6A illustrates an example dashboard agent 602 architecture to facilitate presentation of information 604, 606, 608, 610 about one or more root cause issues to a user 614. FIG. 6B illustrates an example web interface to display information 604, 606, 608, 610 in conjunction with a dashboard agent 602. A dashboard agent 602, as described above in conjunction with FIG. 2, is data values and/or software instructions that, when executed, present or otherwise provide information about one or more root causes of application performance degradation related to computing resources of a computing resource services provider to a user 614. In an embodiment, a dashboard agent 602 provides information through a web interface, such as that illustrated in FIG. 6B, accessible by one or more users 614. A web interface has controlled access for a specific user 614 or is generally usable by one or more users 614. In another embodiment, a dashboard agent 602 generates one or more reports comprising information 604, 606, 608, 610 about one or more root causes of application performance degradation. A dashboard agent 602 communicates or otherwise provides generated reports to one or more users 614. A dashboard agent 602, in another embodiment, uses any facility provided by a computing resource services provider to indicate information related to one or more root causes of application performance degradation identified by root cause analysis to one or more users 614.

A dashboard agent 602 receives, from an analysis service 616, information 604, 606, 608, 610 related to one or more root causes of application performance degradation identified by root cause analysis operations and/or functions implemented or otherwise performed by a computing resource services provider. In an embodiment, a dashboard agent 602 receives, from an analysis service 616, information comprising a selected timeframe 604 for presentation to one or more users 614 using presentation techniques described above and further described herein, such as in a web interface illustrated by FIG. 6B. A selected timeframe 604 is one or more data values, specified or provided by a user in user-supplied diagnostics described herein, indicating a time window used to gather data analyzed during root cause analysis, as described above in conjunction with FIG. 5.

In an embodiment, a dashboard agent 602 receives, from an analysis service 616, information comprising resource metrics 606 for presentation to one or more users 614 using presentation techniques described above and further described herein. Resource metrics 606 are one or more data values indicating resource values determined by one or more root cause analysis operations during root cause analysis, as described above in conjunction with FIG. 5. For example, resource metrics 606 comprise data values indicating memory usage and network bandwidth associated with an application having degraded performance. Resource metrics 606 indicate one or more root causes of performance degradation determined by one or more first degree analysis operations, as described above in conjunction with FIGS. 2, 3, and 5. Resource metrics 606, in an embodiment, are displayed in a user interface such as a web interface illustrated by FIG. 6B. A user interface, in an embodiment, is any graphical interface for displaying resource metrics 606. Resource metrics 606, in an embodiment, are filtered according to one or more performance indicators. Performance indicators are, in an embodiment, one or more data values usable to query, filter, reduce, or otherwise refine resource metrics 606 presented by a user interface. In an embodiment, performance indicators are provided by a user receiving or otherwise interacting with the user interface.

In an embodiment, a dashboard agent 602 receives, from an analysis service 616, information comprising related triggers 608 for presentation to one or more users 614 using presentation techniques described above and further described herein. Related triggers 608 are one or more data values indicating second degree and/or third degree causes of application performance degradation identified by second degree or third degree analysis operations during root cause analysis, as described above in conjunction with FIGS. 2, 3, and 5. For example, related triggers 608 comprise information indicating that a specific computing resource group provided by a computing resource services provider is experiencing degraded performance, such as "similar alarms triggered at this time" as illustrated in the example web interface of FIG. 6B.

In an embodiment, a dashboard agent 602 receives, from an analysis service 616, information usable for aggregation into a summary of causes for degraded application performance. Aggregated insights 610 is a set of collected resource metrics 606 summarized into data values that are understandable to one or more users 614, as illustrated in the example web interface of FIG. 6B. For example, aggregated insights 610 is a summary of computing resources used by an application having degraded performance, including indications of computing resources identified as one or more root causes of application performance degradation.

In an embodiment, a dashboard agent 602 comprises recommendations and/or remediation 612 operations to be performed in order to resolve application performance degradation. In another embodiment, a dashboard agent 602 does not present any recommendations and/or remediation 612 operations corresponding to one or more root causes of degraded application performance. If a dashboard agent 602 presents to a user, using presentation techniques described above, recommendations and/or remediation 612 operations to be performed in order to resolve application performance degradation, said dashboard agent may present an interface to automatically perform said recommendations and/or remediation 612 operations. For example, a dashboard agent 602, in an embodiment, presents to one or more users 614 one or more user interface objects, such as buttons, usable to invoke automatic execution of one or more recommended operations or remediation operations.

Using information presented by a dashboard agent 602 using techniques described above, a user 614 receives information indicating one or more root causes of application performance degradation. One or more users, in an embodiment, perform one or more recommended operations or remediation operations indicated by a dashboard agent 602 or otherwise known to resolve application performance degradation due to one or more root causes presented by said dashboard agent 602.

FIG. 6B illustrates a web interface for presenting a monitoring dashboard comprising information from a dashboard agent 602, as illustrated in FIG. 6A. A web interface, in an embodiment, comprises a selected timeframe 604 indicating a data window for which one or more analysis operations were performed by a computing resource services provider, as described above in conjunction with FIG. 2. In an embodiment, a web interface comprises a menu allowing one or more users of the web interface to select data and/or information items described above in conjunction with FIG. 6A. For example, a menu allows a user, in an embodiment, to select resource groups related to one or more root causes displayed by a dashboard agent using a web interface.

In an embodiment, a web interface, such as that illustrated in 6B, indicates additional resource information related to computing resources monitored as described above in conjunction with FIG. 2. For example, database usage information, such as graphs and statistics, is usable by a web interface to communicate resource metrics 606 from a dashboard agent 602. Aggregated insights 610 are also, in an embodiment, displayed by a web interface such as the web interface illustrated in FIG. 6B. In an embodiment, aggregated insights 610 display performance graphics indicating computing resource performance during a specific time slice or time window. Additional log data and graphs comparing various resources related to a user application are displayed, in an embodiment, in conjunction with dashboard agent 602 information in a web interface such as that illustrated in FIG. 6B.

Figure 7:
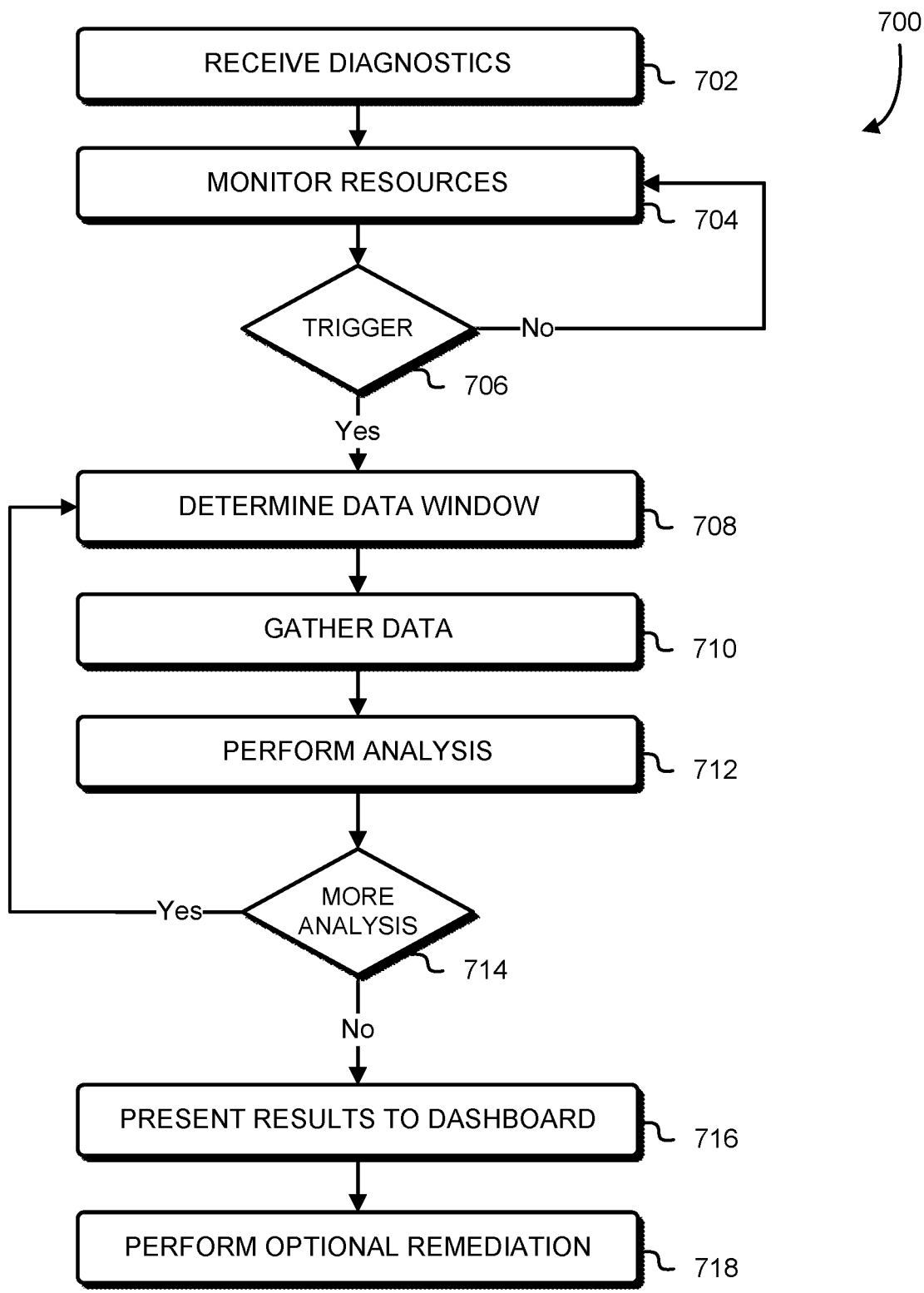
FIG. 7 illustrates a process for performing root cause analysis by a computing resource services provider using user-defined diagnostics.

FIG. 7 illustrates a process 700 for performing root cause analysis by a computing resource services provider using user-defined diagnostics. A computing resource services provider implementing or otherwise performing root cause analysis begins by receiving user-supplied diagnostics 702 from one or more users, as described above in conjunction with FIGS. 2 and 3. A computing resource services provider monitors resources 704 indicated by received diagnostics 702 and/or predetermined computing resources for root cause analysis. If no trigger 706 is monitored or encountered indicating application performance degradation, a computing resource services provider implementing or otherwise performing root cause analysis continues monitoring resources 704.

If a trigger 706 indicating one or more computing resources have exceed a threshold value or are otherwise causing application performance degradation, as described above in conjunction with FIG. 4, then a computing resource services provider implementing or otherwise performing root cause analysis determines a data window 708 according to parameters specified by user-supplied diagnostics, as described above in conjunction with FIGS. 3 and 5. A computing resource services provider implementing or otherwise performing root cause analysis gathers data 710 in a specific time slice or time window 708 indicated by user-supplied diagnostics or according to a default time slice or time window.

Once a computing resource services provider implementing or otherwise performing root cause analysis gathers relevant data 710, said computing resource services provider implementing or otherwise performing root cause analysis performs first degree analysis 712 on said relevant data, as described above in conjunction with FIGS. 2, 3, and 5. If additional layers or degrees of analysis are available 714, and/or if first degree analysis 712 failed to determine one or more root causes of application performance degradation, a computing resource services provider implementing or otherwise performing root cause analysis performs additional levels or degrees of analysis 712 by, if necessary, determining a new data window 708 and gathering data 710 relevant to additional levels or degrees of analysis to be performed 712, as described above in conjunction with FIGS. 3 and 5.

After a computing resource services provider implementing or otherwise performing root cause analysis completes all available analysis operations or one or more root causes of application performance degradation are identified by one or more analysis operations, said computing resource services provider implementing or otherwise performing root cause analysis presents root cause analysis results to a dashboard 716, as described above in conjunction with FIGS. 2 and 6. If user-supplied diagnostics include optional remediation steps to be performed, or if a computing resource services provider implementing or otherwise performing root cause analysis is able to perform automated remediation of one or more root cause issues affecting application performance, said computing resource services provider implementing or otherwise performing root cause analysis performs optional remediation 718. If a user indicates that one or more optional remediation steps are to be performed 718, in an embodiment, then a computing resource services provider implementing or otherwise performing root cause analysis performs said optional remediation steps to improve degraded application performance.

As one skilled in the art will appreciate in light of this disclosure, certain embodiments may be capable of achieving certain advantages, including some or all of the following: (1) customizable application resource monitoring adaptable to changing software application infrastructure and implementation leading to variable computing resource usage, (2) a single resource monitoring solution capable of user customization to facilitate identification of performance issues caused by computing resources across a diverse application infrastructure, (3) reduction of data presented for analysis in determining root causes of application performance degradation, and (4) leverage of diverse computing ecosystem to reduce gaps in data available to identify causes of application performance degradation. Certain embodiments may be capable of achieving certain additional advantages not listed herein. As described above, various mechanisms provide for monitoring of computing resources related to or responsible for degradation of application performance, and are readily extensible to monitoring of other aspects of software applications related to security and identity management.

Figure 8:
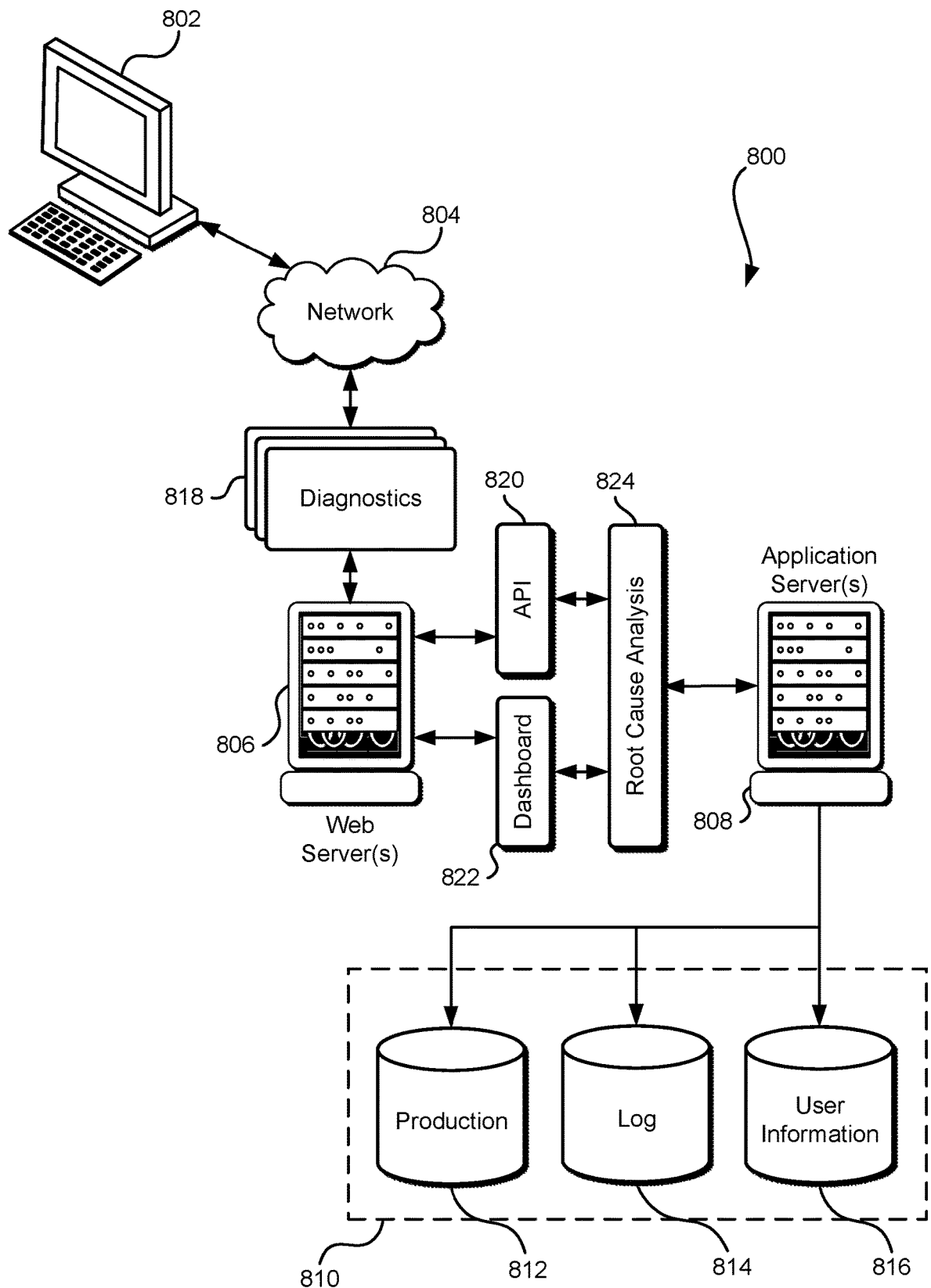
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art. In an embodiment, a web server 806 receives diagnostics 818 as further described above in conjunction with FIGS. 2 and 3 to perform systems, methods, and techniques described herein.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Application layers related to one or more application servers 808 comprise, in an embodiment, layers to perform root cause analysis 824 as described above in conjunction with FIGS. 1-7, further comprising a dashboard 822 to be presented in conjunction with one or more web servers 806 and one or more application programming interfaces (APIs) 820 to facilitate diagnostics 818 usable for root cause analysis 824 as further described herein. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP:

Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in various applications and services, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and application servers that support operations. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
identifying usage of one or more computing resources by a software application performed by a computing resource services provider by at least:
receiving, through an application programming interface, one or more user-defined diagnostics from a user comprising:
a set of parameters indicating the one or more computing resources and one or more computing resource performance thresholds; and
information indicating a set of serverless compute functions to perform analysis operations corresponding to the one or more computing resources wherein the analysis operations are organized into a hierarchy comprising at least a first degree and a second degree, wherein the first degree of analysis operations is directed to a first computing resource, and the second degree of analysis operations is directed to a second computing resource dependent on the first computing resource;
monitoring performance data for the one or more computing resources indicated by the one or more user-defined diagnostics;
in response to the performance data indicating the one or more computing resources met the one or more computing resource performance thresholds, transmitting one or more application programming interface calls to a serverless compute service to cause the serverless compute service to launch the set of serverless compute functions to perform the analysis operations in hierarchical order to determine a cause of meeting the one or more computing resource performance thresholds, wherein analysis operations in the second degree are performed in response to analysis operations in the first degree failing to determine the cause of meeting the one or more computing resource performance thresholds;

obtaining information indicating results of the analysis operations in the hierarchical order; and providing the information indicating the results of the analysis operations to be presented in a user interface to the user.

2. The computer-implemented method of claim 1, wherein the information indicating the set of serverless compute functions to perform the analysis operations further indicates a set of serverless compute functions to perform a set of remediation operations, the set of remediation operations performed in response to the results of the analysis operations.

3. The computer-implemented method of claim 1, wherein the performance data is recorded by a computing resource monitoring service of the computing resource services provider and the computing resource monitoring service transmits one or more application programming interface calls to the serverless compute service in response to the performance data.

4. The computer-implemented method of claim 1, wherein the user interface is a web interface comprising information about the performance data and the information indicating the results of the analysis operations, the web interface provided by the computing resource services provider.

5. A system, comprising:
one or more processors;
memory that stores computer-executable instructions that, if executed, cause the one or more processors to:
receive, by a computing resource services provider, via an interface, one or more user-defined diagnostics from a user comprising:
a set of parameters indicating one or more computing resources to be monitored; and
information indicating a set of serverless compute functions to perform a set of analysis functions grouped in hierarchy of one or more levels to be triggered in response to performance monitoring of the one or more computing resources indicating degraded performance;
in response to the performance monitoring indicating degraded performance of the one or more computing resources based on the one or more user-defined diagnostics, transmit one or more application programming interface calls to a serverless compute service to cause the set of analysis functions indicated by the one or more user-defined diagnostics to run in hierarchical order of the one or more levels until a level of the analysis functions in the hierarchical order determine a cause of the degraded performance, wherein a first computing resource associated with a first level of the analysis functions belongs to a second computing resource associated with a second level of the analysis functions; and
provide to the user results of performance of the set of analysis functions to enable performance of the one or more computing resources to be restored.

6. The system of claim 5, wherein the computer-executable instructions further cause the one or more processors to monitor performance of the one or more computing resources using a computing resource monitoring service of the system and, in response to the performance monitoring indicating degraded performance, performing the set of analysis functions specific to the one or more computing resources monitored by the computing resource monitoring service.

7. The system of claim 5, wherein the computer-executable instructions further cause the one or more processors to receive, via the interface, one or more usage values indicating degraded performance of the one or more computing resources.

8. The system of claim 5, wherein the analysis functions comprise one or more first analysis operations and one or more second analysis operations, the one or more first analysis operations associated with the one or more computing resources and the one or more second analysis operations associated with one or more second computing resources associated with the one or more computing resources.

9. The system of claim 5, wherein the performance monitoring of the one or more computing resources is performed using one or more performance data sets associated with the one or more computing resources for a time value received via the interface.

10. The system of claim 9, wherein the results of performance of the set of analysis functions are provided to a web interface to the system indicating the results of performance of the set of analysis functions and the cause of the degraded performance.

11. The system of claim 5, wherein the computer-executable instructions further cause the one or more processors to perform a remediation operation to restore performance of the one or more computing resources in response to the results of performance of the set of analysis functions.

12. A non-transitory computer-readable storage medium storing thereon executable instructions that, as a result of being executed by one or more processors of a computer system, cause the computer system to at least:
receive by a computing resource services provider one or more user-defined diagnostics from a user:
information indicating one or more computing resources to be monitored and a set of serverless compute functions to perform a set of analysis functions to diagnose a set of performance issues of the one or more computing resources, wherein the set of analysis operations are organized into one or more degrees in hierarchy, wherein a second degree of the analysis operations are specific to dependent computing resources to those computing resources indicated by a first degree of the analysis operations;
transmit one or more application programming interface calls to a serverless compute service to launch the set of analysis functions indicated by the one or more user-defined diagnostics;
run the set of analysis functions degree by degree in the hierarchy to determine at least one of cause of the set of performance issues, wherein analysis operations in subsequent degrees are not performed once the at least one cause of the set of performance issues is determined; and
update a dashboard interface of the user with a set of results of performance of the set of analysis functions.

13. The non-transitory computer-readable storage medium of claim 12, wherein the executable instructions further comprise instructions that, as a result of being executed by the one or more processors, cause the computer system to receive, from an interface, the set of analysis functions to diagnose the set of performance issues of the one or more computing resources.

14. The non-transitory computer-readable storage medium of claim 12, wherein the executable instructions further comprise instructions that, as a result of being executed by the one or more processors, cause the computer system to perform a first subset of the analysis functions associated with the one or more computing resources and perform a second subset of the analysis functions associated with one or more second computing resources associated with the one or more computing resources.

15. The non-transitory computer-readable storage medium of claim 12, wherein the executable instructions that cause the computer system to update the dashboard interface with the set of results of performance of the set of analysis functions further include instructions that cause the computer system to perform a remediation operation to restore performance of the one or more computing resources.

16. The non-transitory computer-readable storage medium of claim 12, wherein the executable instructions further cause the computer system to receive the information indicating the set of performance issues of the one or more computing resources from a computing resource monitoring service, the information corresponding to one or more performance indicators received from an interface.

17. The non-transitory computer-readable storage medium of claim 12, wherein the executable instructions further cause the computer system to present the dashboard interface as a web interface comprising at least the set of results of performance of the set of analysis functions and the information indicating the set of performance issues of the one or more computing resources.

18. The non-transitory computer-readable storage medium of claim 12, wherein the set of analysis functions to determine at least one of a cause of the set of performance issues are performed, at least in part, by the serverless compute service.

19. The non-transitory computer-readable storage medium of claim 12, wherein the executable instructions further cause the computer system to receive information indicating the set of performance issues of the one or more computing resources from a computing resource monitoring service, the one or more computing resources specified using an interface to the computing resource monitoring service.

* * * * *